US010189655B2

(12) United States Patent
Pradelli et al.

(10) Patent No.: US 10,189,655 B2
(45) Date of Patent: Jan. 29, 2019

(54) TRANSPORTING APPARATUS

(71) Applicant: Tetra Laval Holdings & Finance S.A., Pully (CH)

(72) Inventors: Massimo Pradelli, Reggio Emilia (IT); Fabrizio Rimondi, Bologna (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/558,665

(22) PCT Filed: Mar. 24, 2016

(86) PCT No.: PCT/EP2016/056501
§ 371 (c)(1),
(2) Date: Sep. 15, 2017

(87) PCT Pub. No.: WO2016/162217
PCT Pub. Date: Oct. 13, 2016

(65) Prior Publication Data
US 2018/0111768 A1 Apr. 26, 2018

(30) Foreign Application Priority Data
Apr. 7, 2015 (EP) ..................................... 15162524

(51) Int. Cl.
B61B 3/02 (2006.01)
B65G 35/00 (2006.01)
B65G 54/02 (2006.01)

(52) U.S. Cl.
CPC ............... B65G 54/02 (2013.01); B61B 3/02 (2013.01); B65G 35/00 (2013.01); B65G 2201/02 (2013.01)

(58) Field of Classification Search
CPC .... B65G 54/02; B65G 35/00; B65G 2201/02; B61B 3/02
See application file for complete search history.

(56) References Cited

U.S. PATENT DOCUMENTS 4,716,346 A * 12/1987 Matsuo ................. B60L 15/005
310/13
4,848,242 A * 7/1989 Matsuo ................... B60L 13/03
104/290

(Continued)

FOREIGN PATENT DOCUMENTS

EP 2560904 B1 4/2015
FR 2367938 5/1978

(Continued)

OTHER PUBLICATIONS

International Search Report and Written Opinion from corresponding PCT Application No. PCT/EP2016/056501 dated Jun. 20, 2016 (14 pages).

Primary Examiner — Jason C Smith
(74) Attorney, Agent, or Firm — Finnegan, Henderson, Farabow, Garrett & Dunner LLP

(57) ABSTRACT

A transporting apparatus comprises a track (2) and at least one movable element (3) movable along said track (2), said movable element (3) comprising a supporting body (14), said track (2) comprising a first guiding surface (11a) and a further first guiding surface (lib) facing towards said supporting body (14), a second guiding surface (12a) and a further second guiding surface (12b) facing away from said supporting body (14), and a third guiding surface (13a) arranged transversally to said first guiding surface (11a) and said second guiding surface (12a) and a further third guiding surface (13b) arranged transversally to said further first guiding surface (lib) and said further second guiding surface (12b), wherein said movable element (3) comprises a first couple of rollers (15) slidably coupled to said first guiding surface (11a), a further first couple of rollers (16) slidably coupled to said further first guiding surface (lib), a second couple of rollers (17) slidably coupled to said second guiding surface (12a), a further second couple of rollers (18)

(Continued)

slidably coupled to said further second guiding surface (12b), a third couple of rollers (19) slidably coupled to said third guiding surface (13a) and a further third couple of rollers (20) slidably coupled to said further third guiding surface (13b).

15 Claims, 4 Drawing Sheets

(56) References Cited

U.S. PATENT DOCUMENTS

| | | | | |
|---|---|---|---|---|
| 4,924,164 A * | 5/1990 | Riley | ............... | B61C 13/04 |
| | | | | 180/168 |
| 9,902,566 B2 * | 2/2018 | Pedretti | ............... | B65G 47/24 |
| 2018/0111768 A1 * | 4/2018 | Pradelli | ............... | B65G 54/02 |

FOREIGN PATENT DOCUMENTS

| | | |
|---|---|---|
| FR | 2792608 | 10/2000 |
| JP | 2002-46848 A | 2/2002 |
| WO | WO 2000064751 A1 | 11/2000 |

* cited by examiner

TRANSPORTING APPARATUS

CROSS-REFERENCE TO RELATED PATENT APPLICATIONS

This is a National Phase of International Application No. PCT/EP2016/056501, filed Mar. 24, 2016, which claims the benefit of European Application No. 15162524.1 filed Apr. 7, 2015. The entire contents of the above-referenced applications are expressly incorporated herein by reference.

TECHNICAL FIELD

The invention relates to a transporting apparatus for conveying an object. The object may be a device, or a tool, of a machine, in particular a packaging machine.

BACKGROUND OF INVENTION

Transporting apparatus based on linear motor technology are known, which comprise a track that houses a stator armature formed by a plurality of individually-excitable solenoids, and a plurality of movable elements or carts that house respective permanent magnets and are independently moved along the track by individually controlling the solenoids.

The track comprises guide elements and the movable elements comprise wheels slideable along the guide elements of the track.

In case the movable element supports a device, or a tool, of a machine, the position of the movable element with respect to the track has to be extremely precise, in order to assure that the machine works in a proper way.

A drawback of the known transporting apparatus is that there might be an excessive play, or clearance, between the wheels and the guide elements, leading to a mispositioning of the movable elements with respect to the track. In case the transporting apparatus are used in a machine, this may cause a mispositioning of the device, or tool, supported by the movable elements.

DISCLOSURE OF INVENTION

An object of the invention is to improve the known transporting apparatus.

Another object of the invention is to provide a transporting apparatus that has high stiffness and extremely limited play, or clearance.

Another object of the invention is to provide a transporting apparatus that, when used in a machine, is able to carry a tool of the machine and position the tool in a very accurate and precise way.

According to the invention there is provided a transporting apparatus as claimed in claim 1.

BRIEF DESCRIPTION OF THE DRAWINGS

A preferred, non-limiting embodiment of the invention will be described by way of example with reference to the accompanying drawings, in which.

DETAILED DESCRIPTION OF PREFERRED EMBODIMENTS

Figure 1:
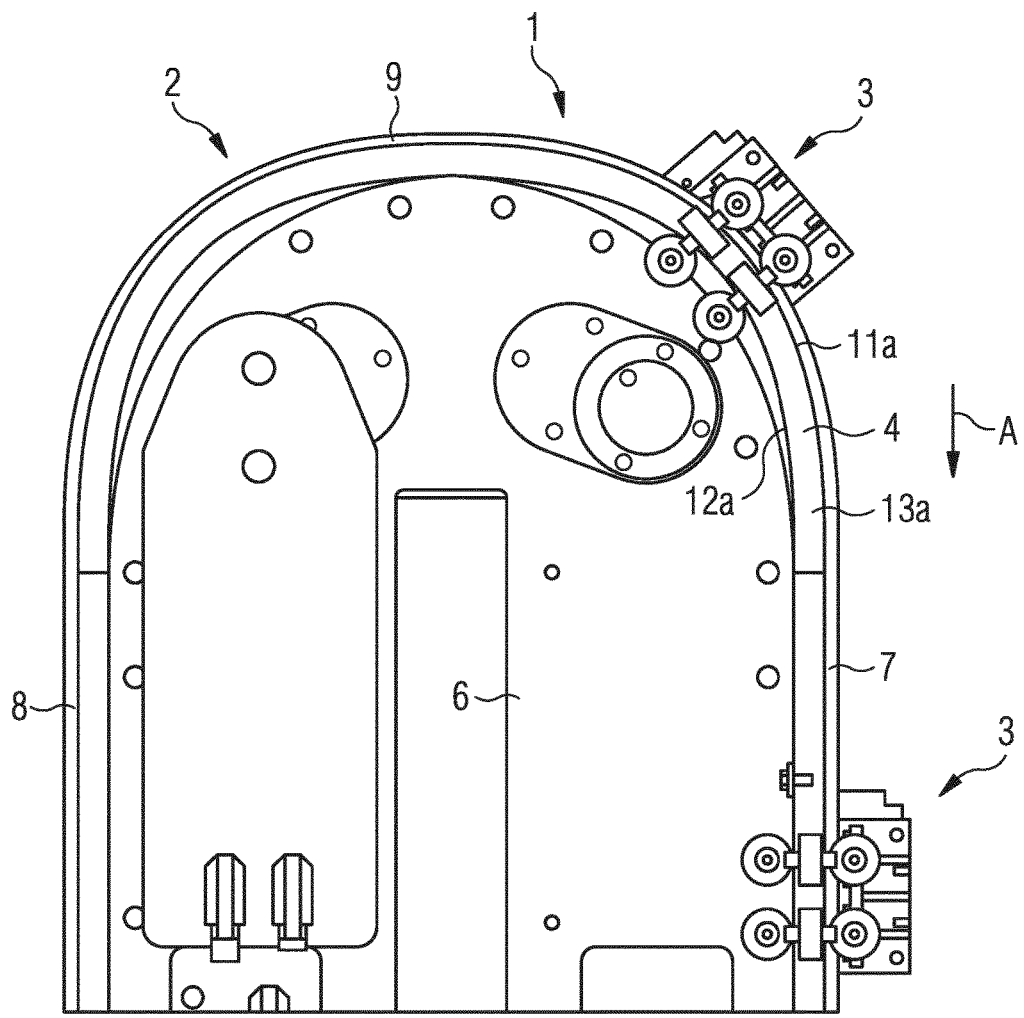
FIG. 1 is a side view, with parts removed for clarity, of an apparatus according to the invention.
Figure 2:
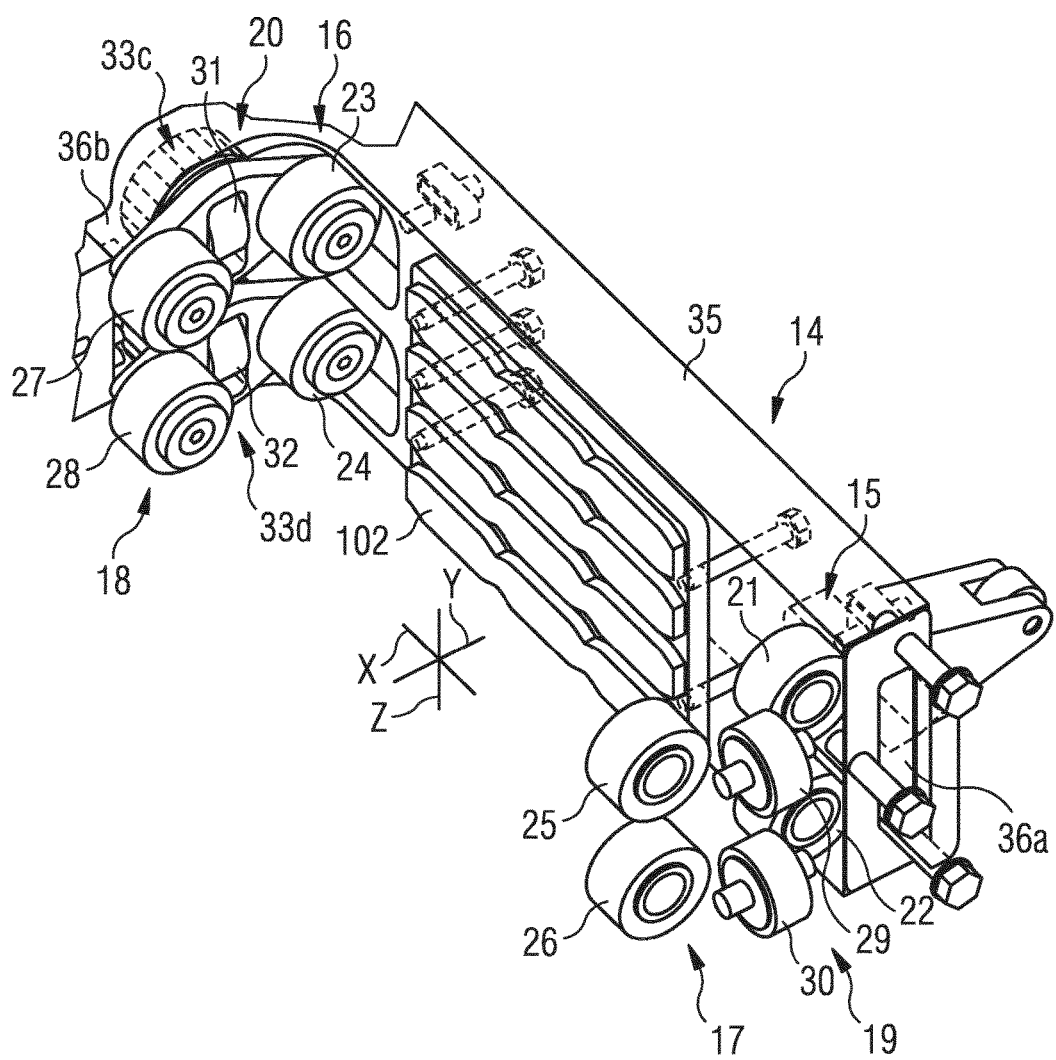
FIG. 2 is a perspective side view, with parts removed for clarity, of a movable element of the apparatus of FIG. 1.
Figure 3:
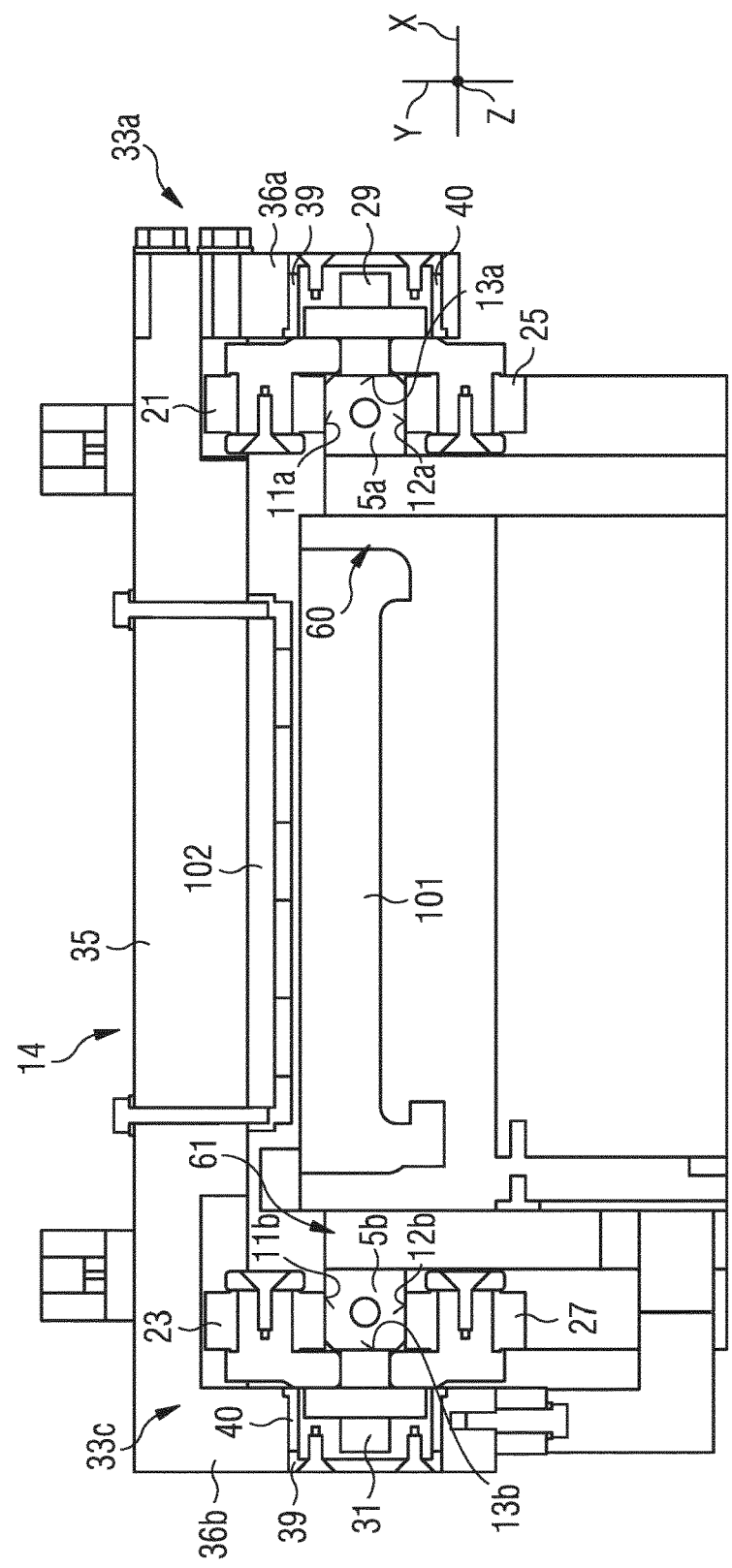
FIG. 3 is a transversal section, with parts removed for clarity, of the movable element of FIG. 2.
Figure 4:
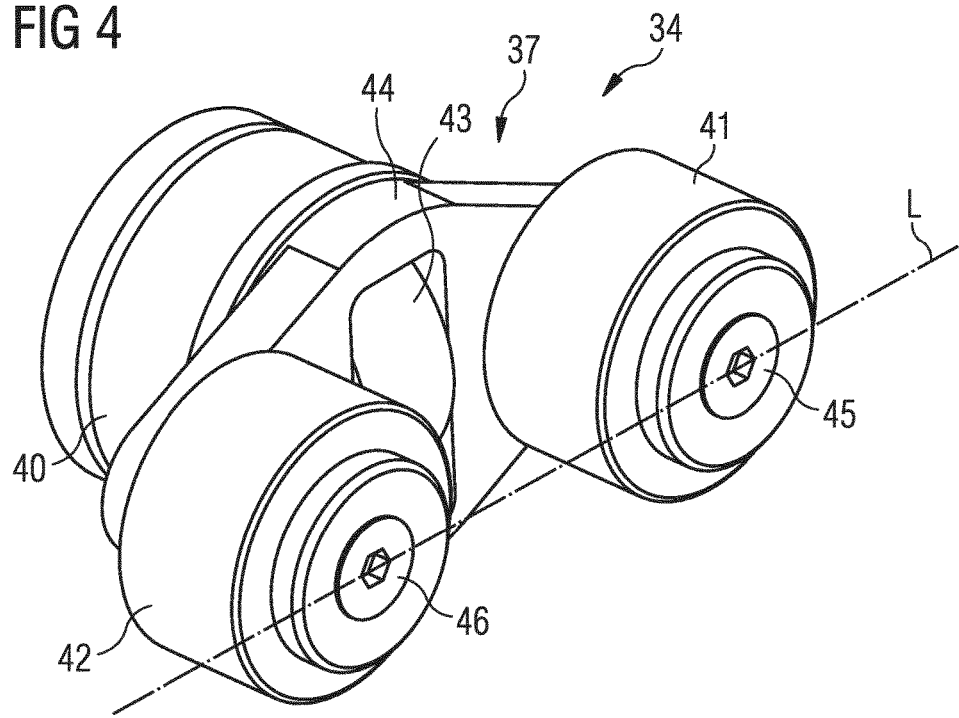
FIG. 4 is a perspective view of a rotation element that supports rollers of the movable element of FIGS. 2 and 3.
Figure 5:
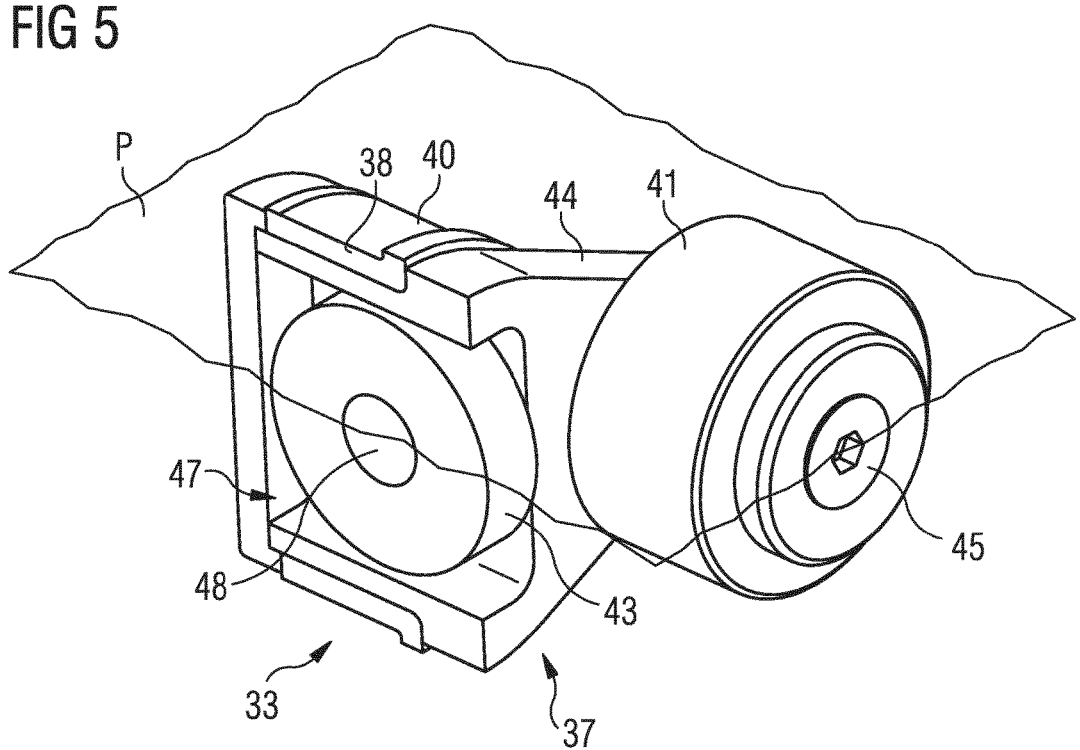
FIG. 5 is a partly sectioned perspective view of the rotation element of FIG. 4.

With reference to FIGS. 1 to 5, there is shown a transporting apparatus 1 comprising a track 2 and a plurality of movable elements 3 movable along the track 2.

The track 2 houses a stator armature formed by a plurality of individually-excitable solenoids 101 and the movable elements 3 house permanent magnets 102.

The movable elements 3 are independently movable along the track 2 by individually controlling the solenoids 101.

In another embodiment, the track 2 houses the permanent magnets and the movable elements 3 house the individually-excitable solenoids.

The movable elements 3 are arranged for carrying an object. In case the transporting apparatus is used in a machine, in particular a packaging machine, the above-mentioned object may be a device, or a tool, that carries out a certain operation in the machine.

In particular, in case of a packaging machine for manufacturing packages by folding, filling and sealing a web of packaging material, the device, or tool, can be a forming element for forming a package, or a moulding element for moulding plastics on the packaging material to obtain an opening device of the package.

The track 2 comprises a guiding member 4 on which the movable elements 3 are movable.

The guiding member 4 comprises a first plate 5a projecting from a first side 60 of a frame 6 of the track 2.

The guiding member 4 also comprises a second plate 5b projecting from a second side 61, opposite to the first side 60, of the frame 6.

The guiding member 4 has a first linear branch 7 and a second linear branch 8. The first linear branch 7 and the second linear branch 8 are substantially parallel to each other.

In the embodiment shown the first linear branch 7 and the second linear branch 8 are arranged in a vertical plane.

The guiding member 4 further comprises a first curved branch 9 and a second curved branch (not shown) interposed between the first linear branch 7 and the second linear branch 8. The first curved branch 9 and the second curved branch are opposite to each other. In this way, the guiding member 4 has a substantially oval longitudinal cross section.

The movable elements 3 comprise a supporting body 14 arranged for supporting the above-mentioned object, i.e. the device, or tool, in the case of a machine.

The movable elements 3 further comprise a first couple of rollers 15, a further first couple of rollers 16, a second couple of rollers 17, a further second couple of rollers 18, a third couple of rollers 19 and a further third couple of rollers 20 that are rotatably connected to the supporting body 14 and slidably coupled with the guiding member 4.

The guiding member 4 comprises a first guiding surface 11a and a further first guiding surface 11b facing towards the supporting body 14, a second guiding surface 12a and a further second guiding surface 12b facing away from the supporting body 14, and a third guiding surface 13a arranged transversally with respect to the first guiding surface 11a and the second guiding surface 12a, and a further third guiding surface 13b arranged transversally with respect to the further first guiding surface 11b and the further second guiding surface 12b.

The first guiding surface 11a and the further first guiding surface 11b are mutually aligned.

The second guiding surface 12a and the further second guiding surface 12b are mutually aligned.

The second guiding surface 12a is arranged on the opposite side of the supporting body 14 with respect to the first guiding surface 11a.

The further second guiding surface 12b is arranged on the opposite side of the supporting body 14 with respect to the further first guiding surface 11b.

The first guiding surface 11a and the further first guiding surface 11b are parallel to the second guiding surface 12a and the further second guiding surface 12b.

The third guiding surface 13a is perpendicular to the first guiding surface 11a and to the second guiding surface 12a.

The further third guiding surface 13b is perpendicular to the further first guiding surface 11b and to the further second guiding surface 12b.

The third guiding surface 13a is parallel to the further third guiding surface 13b.

The first plate 5a comprises the first guiding surface 11a, the second guiding surface 12a and the third guiding surface 13a.

The second plate 5b comprises the further first guiding surface 11b, the further second guiding surface 12b and the further third guiding surface 13b.

The first couple of rollers 15 slides along the first guiding surface 11a.

The further first couple of rollers 16 slides along the further first guiding surface 11b.

The second couple of rollers 17 slides along the second guiding surface 12a.

The further second couple of rollers 18 slides along the further second guiding surface 12b.

The third couple of rollers 19 slides along the third guiding surface 13a.

The further third couple of rollers 20 slides along the further third guiding surface 13b.

The first couple of rollers 15 comprises a first roller 21 and a second roller 22.

The further first couple of rollers 16 comprises a third roller 23 and a fourth roller 24.

The second couple of rollers 17 comprises a fifth roller 25 and a sixth roller 26.

The further second couple of rollers 18 comprises a seventh roller 27 and an eighth roller 28.

The third couple of rollers 19 comprises a ninth roller 29 and a tenth roller 30.

The further third couple of rollers 20 comprises an eleventh roller 31 and a twelfth roller 32.

The movable elements 3 slide on the track 2 along an advancing direction A.

The movable elements 3 move on the track 2 along an axis Z, parallel to the advancing direction A.

The first roller 21, the second roller 22, the third roller 23, the fourth roller 24, the fifth roller 25, the sixth roller 26, the seventh roller 27 and the eighth roller 28 prevents the movable element 3 from moving along a further axis Y perpendicular to axis Z and also perpendicular to the first guiding surface 11a, the further first guiding surface 11b, the second guiding surface 12a and the further second guiding surface 12b.

The ninth roller 29, the tenth roller 30, the eleventh roller 31 and the twelfth roller 32 prevent the movable element 3 from moving along a still further axis X perpendicular to axis Z and also perpendicular to the third guiding surface 13a and the further third guiding surface 13b.

Axis Z, further axis Y and still further axis X are perpendicular to each other.

Axis Z, further axis Y and still further axis X are to be intended as integral with the movable element 3, as the movable element 3 moves along the track 4.

The second roller 22 and the fifth roller 25, and the fourth roller 24 and the seventh roller 27, prevent the movable elements 3 from rotating around still further axis X, in a clockwise direction.

The first roller 21 and the sixth roller 26, and the third roller 23 and the eighth roller 28, prevent the movable elements 3 from rotating around still further axis X, in a counter-clockwise direction.

The tenth roller 30 and the eleventh roller 31 prevent the movable elements 3 from rotating around further axis Y, in a clockwise direction.

The ninth roller 29 and the twelfth roller 32 prevent the movable elements 3 from rotating around further axis Y, in a counter-clockwise direction.

The first roller 21 and the second roller 22, and the seventh roller 27 and the eighth roller 28, prevent the movable elements 3 from rotating around axis Z, in a clockwise direction.

The fifth roller 25 and the sixth roller 26, and the third roller 23 and the fourth roller 24, prevent the movable elements 3 from rotating around axis Z, in a counter-clockwise direction.

The rotation axes of the rollers of the first couple of rollers 15, i.e. the rotation axes of the first roller 21 and the second roller 22, are parallel to still further axis X and perpendicular to the third guiding surface 13a and the further third guiding surface 13b.

The rotation axes of the rollers of the further first couple of rollers 16, i.e. the rotation axes of the third roller 23 and the fourth roller 24, are parallel to still further axis X and perpendicular to the third guiding surface 13a and the further first guiding surface 13b.

The rotation axes of the rollers of the second couple of rollers 17, i.e. the rotation axes of the fifth roller 25 and the sixth roller 26, are parallel to still further axis X and perpendicular to the third guiding surface 13a and the further third guiding surface 13b.

The rotation axes of the rollers of the further second couple of rollers 18, i.e. the rotation axes of the seventh roller 27 and the eighth roller 28, are parallel to still further axis X and perpendicular to the third guiding surface 13a and the further second guiding surface 13b.

The rotation axes of the rollers of the third couple of rollers 19, i.e. the rotation axes of the ninth roller 29 and the tenth roller 30, are parallel to further axis Y and perpendicular to the first guiding surface 11a, the further first guiding surface 11b, the second guiding surface 12a and the further second guiding surface 12b.

The rotation axes of the rollers of the further third couple of rollers 20, i.e. the rotation axes of the eleventh roller 31 and the twelfth roller 32, are parallel to further axis Y and perpendicular to the first guiding surface 11a, the further first guiding surface 11b, the second guiding surface 12a and the further second guiding surface 12b.

The first roller 21, the second roller 22, the third roller 23, the fourth roller 24, the fifth roller 25, the sixth roller 26, the seventh roller 27, the eighth roller 28, the ninth roller 29, the tenth roller 30, the eleventh roller 31 and the twelfth roller 32 are mounted on the supporting body 14 by means of rotation units 33, each supporting a group of rollers 34.

Each group of rollers 34 comprises three rollers, a roller belonging to the first couple of rollers 15 or to the further first couple of rollers 16, a further roller belonging to the second couple of rollers 17 or, respectively, to the further second couple of rollers 18 and a still further roller belonging to the third couple of rollers 19 or, respectively, to the further third couple of rollers 20.

The supporting body 14 comprises a front part 35 substantially extending in a plane defined by axis Z and still further axis X and a first side part 36a and a second side part 36b protruding from opposite sides of the front part 35 and each substantially extending in a plane defined by axis Z and further axis Y. The front part 35 is arranged to support the above-mentioned object.

Each rotation unit 33 comprises a rotation element 37 that is rotatably coupled to the supporting body 14, in particular to the first side part 36a or to the second side part 36b, and is rotatable around a rotation axis parallel to the still further axis X, i.e. perpendicular to the third guiding surface 13a and to the further third guiding surface 13b.

Each movable element 3 comprises four rotation units 33, in particular a first rotation unit 33a (shown in FIG. 3) and a second rotation unit (not shown) rotatably coupled to the first side part 36a, and a third rotation unit 33c (shown in FIGS. 2 and 3) and a fourth rotation unit 33d (shown in FIG. 2) rotatably coupled to the second side part 36b.

The first rotation unit 33a comprises the first roller 21, the fifth roller 25 and the ninth roller 29.

The second rotation unit comprises the second roller 22, the sixth roller 26 and the tenth roller 30. The third rotation unit 33c comprises the third roller 23, the seventh roller 27 and the eleventh roller 31.

The fourth rotation unit 33d comprises the fourth roller 24, the eighth roller 28 and the twelfth roller 32.

In the next passages of the description, since the first rotation unit 33a, the second rotation unit, the third rotation unit 33c and the fourth rotation unit 33d are identical to each other, reference will be made to only one rotation element 37, and the three rollers of the corresponding group of rollers 34 will be generally referred to—for sake of simplicity and conciseness—as roller 41, further roller 42 and still further roller 43.

It is to be intended that in the first rotation unit 33a roller 41 corresponds to the fifth roller 25, further roller 42 corresponds to the first roller 21 and still further roller 43 corresponds to ninth roller 29.

Similarly, it is to be intended that in the second rotation unit roller 41 corresponds to the sixth roller 26, further roller 42 corresponds to the second roller 22 and still further roller 43 corresponds to tenth roller 30.

Similarly, it is to be intended that in the third rotation unit 33c roller 41 corresponds to the third roller 23, further roller 42 corresponds to the seventh roller 27 and still further roller 43 corresponds to eleventh roller 31.

Similarly, it is to be intended that in the fourth rotation unit 33d roller 41 corresponds to the fourth roller 24, further roller 42 corresponds to the eighth roller 28 and still further roller 43 corresponds to twelfth roller 32.

The rotation element 37 comprises a shaft portion 38 received in a hole 39 of the first side part 36a, or the second side part 36b. A bearing 40 is interposed between the shaft portion 38 and the first side part 36a, or the second side part 36b.

The rotation element 37 further comprises a bracket portion 44 that comprises a pin 45 that rotatably supports the roller 41 and a further pin 46 that rotatably supports the further roller 42.

The rotation element 37 further comprises a seat 47 that receives the still further roller 43.

The rotation element 37 comprises a still further pin 48 protruding into the seat 47 and rotatably supporting the still further roller 43.

The axes of rotation of the roller 41 and the further roller 42 are aligned on a line L.

The axes of rotation of the roller 41, the further roller 42 and the still further roller 43 are arranged in a plane P.

The minimum distance between the roller 41 and the further roller 42 is less than the width of the first plate 5a, or the second plate 5b, measured along further axis Y. In other words, the minimum distance between the roller 41 and the further roller 42 is less than the distance between the first guiding surface 11a and the second guiding surface 12a or, respectively, the further first guiding surface 11b and the further second guiding surface 12b.

In this way, the roller 41 and the further roller 42 are mounted on the guiding member with interference, so as to avoid play, or clearance, between the movable elements 3 and the track 2.

During operation, the movable elements 3 are moved on the track 2 independently from each other by individually controlling the corresponding solenoids.

The first roller 21, the second roller 22, the third roller 23, the fourth roller 24, the fifth roller 25, the sixth roller 26, the seventh roller 27, the eighth roller 28, the ninth roller 29, the tenth roller 30, the eleventh roller 31 and the twelfth roller 32 precisely guide the movable elements 3 in the advancing direction A, i.e. along axis Z and prevent any other movement of the movable elements 3 along still further axis X and further axis Y, and around still further axis X, further axis Y and axis Z.

Due to the rotation elements 37, the line L is always kept perpendicular to the first guiding surface 11a and the second guiding surface 12a or, respectively, to the further first guiding surface 11b and the further second guiding surface 12b. In particular, when the movable elements 3 move along the first curved branch 9, or the second curved branch, the line L is always so oriented as to pass through the centre of curvature of the first curved branch 9, or—respectively—the second curved branch.

Owing to the invention it is possible to obtain a transporting apparatus 1 in which the movable elements 3 are substantially not allowed any movement apart from the one along the advancing direction A.

In addition, due to the position of the first couple of rollers 15, the further first couple of rollers 16, the second couple of rollers 17, the further second couple of rollers 18, the third couple of rollers 19 and the further third couple of rollers 20 the transporting apparatus 1 has high stiffness, and the movable elements 3 may carry rather heavy objects without compromising a good positioning of the objects. In particular, in the case of a machine, the above-mentioned devices, or tools, can be precisely positioned also in case they are cantilevered to the movable elements 3 and, therefore, the movable elements 3 are subjected to significant loads.

In addition, due to the rotation elements 37, the movable elements 3 are properly guided both along the first linear branch 7 and second linear branch 8, and the first curved branch 9 and second curved branch.

Clearly, changes may be made to the transporting apparatus as described and illustrated herein without, however, departing from the scope of the present invention as defined in the accompanying claims.

The invention claimed is:

1. A transporting apparatus, comprising a track and at least one movable element movable along said track, said movable element comprising a supporting body, said track comprising a first guiding surface and a further first guiding surface facing towards said supporting body, a second guiding surface and a further second guiding surface facing away from said supporting body, and a third guiding surface arranged transversally to said first guiding surface and said second guiding surface and a further third guiding surface arranged transversally to said further first guiding surface and said further second guiding surface, wherein said movable element comprises a first couple of rollers slidably coupled to said first guiding surface, a further first couple of rollers slidably coupled to said further first guiding surface, a second couple of rollers slidably coupled to said second guiding surface, a further second couple of rollers slidably coupled to said further second guiding surface, a third couple of rollers slidably coupled to said third guiding surface and a further third couple of rollers slidably coupled to said further third guiding surface, and further comprising four rotation units each supporting a group of three rollers, each group of three rollers comprising a roller belonging to said first couple of rollers or to said further first couple of rollers, a further roller belonging to said second couple of rollers or, respectively, to said further second couple of rollers and a still further roller belonging to said third couple of rollers or, respectively, to said further third couple of rollers.

2. The transporting apparatus according to claim 1, wherein said first guiding surface and said further first guiding surface are mutually aligned, wherein said second guiding surface and said further second guiding surface are mutually aligned and parallel to said first guiding surface and said further first guiding surface, and wherein said third guiding surface is perpendicular to said first guiding surface and said second guiding surface, and said further third guiding surface is perpendicular to said further first guiding surface and said further second guiding surface.

3. The transporting apparatus according to claim 1, wherein the rotation axes of the rollers of said first couple of rollers are perpendicular to said third guiding surface and said further third guiding surface, wherein the rotation axes of the rollers of said further first couple of rollers are perpendicular to said third guiding surface and said further first guiding surface, wherein the rotation axes of the rollers of said second couple of rollers are perpendicular to said third guiding surface and said further third guiding surface, wherein the rotation axes of the rollers of said further second couple of rollers are perpendicular to said third guiding surface and said further second guiding surface, wherein the rotation axes of the rollers of said third couple of rollers are perpendicular to said first guiding surface, said further first guiding surface, said second guiding surface and said further second guiding surface, and wherein the rotation axes of the rollers of said further third couple of rollers are perpendicular to said first guiding surface, said further first guiding surface, said second guiding surface and said further second guiding surface.

4. The transporting apparatus according to claim 1, wherein said second guiding surface is arranged on the opposite side of said supporting body with respect to said first guiding surface, and wherein said further second guiding surface is arranged on the opposite side of said supporting body with respect to said further first guiding surface.

5. The transporting apparatus according to claim 1, wherein said rotation unit comprises a rotation element that is rotatably coupled to said supporting body and is rotatable around a rotation axis perpendicular to said third guiding surface and said further third guiding surface.

6. The transporting apparatus according to claim 5, wherein said rotation element comprises a bracket portion provided with a pin that rotatably supports said roller and a further pin that rotatably supports said further roller.

7. The transporting apparatus according to claim 5, wherein said rotation element further comprises a seat that receives said still further roller and a still further pin protruding into said seat and rotatably supporting said still further roller.

8. The transporting apparatus according to claim 1, wherein the axes of rotation of said roller and said further roller are aligned on a line that, when said movable element moves along said track, remains perpendicular to said first guiding surface, said further first guiding surface, said second guiding surface and further second guiding surface.

9. The transporting apparatus according to claim 1, wherein the axes of rotation of said roller, said further roller and said still further roller are arranged in a plane.

10. The transporting apparatus according to claim 1, wherein said first couple of rollers comprises a first roller and a second roller, said further first couple of rollers comprises a third roller and a fourth roller, said second couple of rollers comprises a fifth roller and a sixth roller, said further second couple of rollers comprises a seventh roller and an eighth roller, said third couple of rollers comprises a ninth roller and a tenth roller and said further third couple of rollers comprises an eleventh roller and a twelfth roller.

11. The transporting apparatus according to claim 10, wherein said movable element comprises four rotation units, a first rotation unit comprising said first roller, said fifth roller and said ninth roller, a second rotation unit comprising said second roller, said sixth roller and said tenth roller, a third rotation unit comprising said third roller, said seventh roller and said eleventh roller, a fourth rotation unit comprising said fourth roller, said eighth roller and said twelfth roller.

12. The transporting apparatus according to claim 11, wherein said supporting body comprises a front part, and a first side part and a second side part protruding from opposite sides of said front part, said first rotation unit and said second rotation unit being rotatably coupled to said first side part, and said third rotation unit and said fourth rotation unit being rotatably coupled to said second side part.

13. The transporting apparatus according to claim 1, wherein said track comprises a guiding member, said guiding member being provided, at a first side thereof, with said first guiding surface, said second guiding surface and said third guiding surface, said guiding member being further provided, at a second side thereof, opposite to said first side, with said further first guiding surface, said further second guiding surface and said further third guiding surface, said guiding member having a first linear branch, a second linear branch, a first curved branch and a second curved branch, said first curved branch and said second curved branch being interposed between said first linear branch and said second linear branch.

14. The transporting apparatus according to claim 1, and comprising a plurality of movable elements, said track housing individually-excitable solenoids and said movable elements housing permanent magnets, or said movable elements housing individually-excitable solenoids and said track housing permanent magnets, said movable elements being independently movable along said track by individually controlling said solenoids.

15. A packaging machine for producing packages from a packaging material, said packaging machine comprising a plurality of tools arranged for carrying out an operation on said packaging material, said packaging machine further comprising a transporting apparatus according to claim 1, wherein each of said movable elements supports one of said tools.

\* \* \* \* \*